United States Patent [19]
Yntema

[11] 3,806,749
[45] Apr. 23, 1974

[54] METHOD AND MEANS OF EFFECTING CHARGE EXCHANGE IN PARTICLE BEAMS

[75] Inventor: Jan L. Yntema, Western Springs, Ill.

[73] Assignee: The United States of America as represented by the United States Atomic Energy Commission, Washington, D.C.

[22] Filed: Jan. 12, 1973

[21] Appl. No.: 323,183

[52] U.S. Cl............... 313/15, 313/39, 313/63, 313/74, 29/592
[51] Int. Cl. ............................................. H05h 7/00
[58] Field of Search ............. 313/15, 39, 63, 74; 29/592

[56] References Cited
UNITED STATES PATENTS 3,631,282  12/1971  Herb ..................................... 313/15
3,239,706  3/1966  Farrell et al. ......................... 313/74

FOREIGN PATENTS OR APPLICATIONS
301,719  12/1928  Great Britain ....................... 313/74

Primary Examiner—Herman Karl Saalbach
Assistant Examiner—Darwin R. Hostetter
Attorney, Agent, or Firm—John A. Horan; Arthur A. Churm; Donald P. Reynolds

[57] ABSTRACT

The usable lifetime of carbon stripping foils used to effect charge exchange in particle beams is extended by depositing a thin electrically conducting layer on the foil, mounting the foil on a holder selected to control thermal expansion, and heating the foil before and during the time it is used for stripping.

7 Claims, 6 Drawing Figures

METHOD AND MEANS OF EFFECTING CHARGE EXCHANGE IN PARTICLE BEAMS

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

The present invention relates to the use of carbon foil as a medium of charge exchange or stripping for particles in a beam.

Stripping is a process whereby particles in a beam are caused to collide with particles of other substances, resulting in a change in the state of ionization of particles in the beam. Two methods of stripping are in general use in particle accelerators. One is gas stripping, in which the beam to be stripped is passed through a stream of gas. The other is foil stripping, in which the beam is passed through a thin solid layer of the stripping material. Of the two methods, foil stripping using carbon as the stripping material has the advantage of producing more highly ionized particles. However, in a range of normalized particle energies below 500 KeV/-nucleon, carbon foils have a short useful lifetime. This is a particular problem in tandem electrostatic accelerators, in which stripping takes place at the high-voltage terminal that is between the two tandem stages. The same problem exists when more accelerating stages are cascaded to produce higher-energy electrostatic accelerators, and it is a pertinent consideration in the design of any type of heavy-ion accelerator in which particles are stripped as a part of the accelerating process.

It has been observed that carbon foils placed as strippers at the high-voltage terminal of a tandem electrostatic accelerator used to accelerate heavy ions last for times of the order of seconds or at most a few minutes before developing tears and requiring replacement. Such a lifetime is insufficient to permit use of such foils for stripping.

It is an object of the present invention to provide a better method and means of stripping particle beams.

It is a further object of the present invention to provide a method of increasing the durability of carbon foils used for charge exchange in particle accelerators.

It is a further object of the present invention to provide a better method and means of stripping charges from accelerated ions in a mass range greater than four atomic mass units.

It is a further object of the present invention to provide a better method and means of stripping charges from particles having energies below 500 KeV/nucleon.

It is a further object of the present invention to provide an increased period of utility for a carbon-foil stripper located at the high-voltage terminal of a tandem electrostatic accelerator.

Other objects will become apparent in the course of a detailed description of the invention.

SUMMARY OF THE INVENTION

Carbon foil used as a medium of charge exchange for stripping beams of charged particles is given increased durability by mounting the foil on a holder selected to control thermal expansion, coating the foil with a thin electrically conducting film, and heating the foil and holder to an elevated temperature before and during stripping.

DETAILED DESCRIPTION OF THE INVENTION

Figure 1:
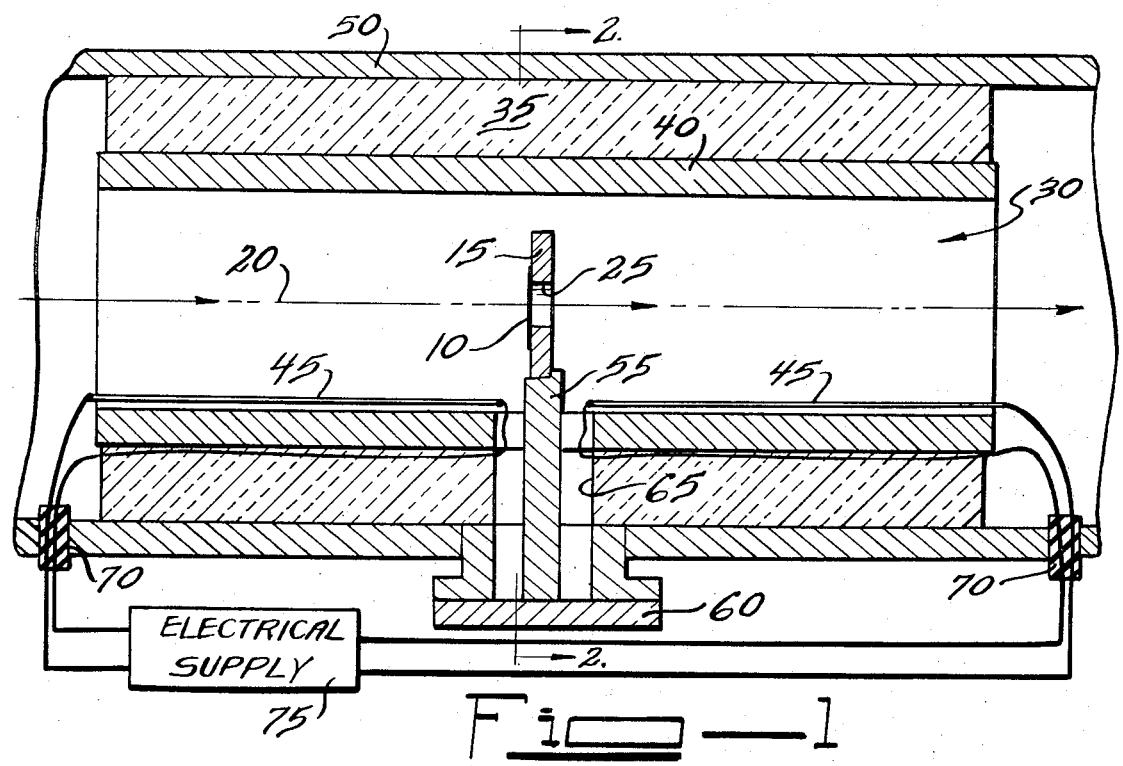
FIG. 1 is a sectional view of a portion of a typical particle accelerator with an apparatus for the practice of the present invention shown in place.
Figure 2:
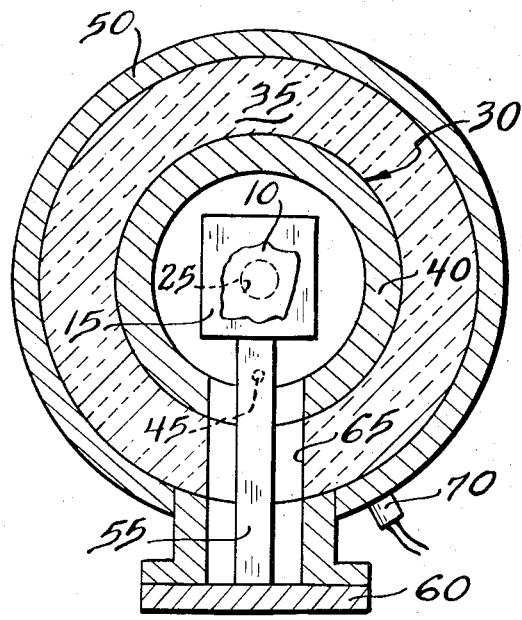
FIG. 2 is a sectional view of the structure shown in FIG. 1 taken along section lines 2—2.

FIGS. 1 and 2 show a portion of a typical particle accelerator showing an apparatus for the practice of the present invention. FIG. 1 is an axial sectional view, and FIG. 2 is a cross-sectional view along section lines 2—2 of FIG. 1. In FIGS. 1 and 2, carbon foil 10 is affixed by adhesion to holder 15 and is disposed in and perpendicular to beam path 20. Holder 15 has a passage 25 extending through holder 15. Passage 25 is covered by carbon foil 10, and holder 15 is placed in beam path 20 so that the beam of particles in beam path 20 passes through carbon foil 10 and passage 25. The collison of charged particles in the beam following beam path 20 with carbon atoms in carbon foil 10 effects the charge interchange which comprises stripping.

Holder 15 and carbon foil 10 are maintained within an oven 30, a hollow cylindrical structure having open ends that is disposed coaxially with respect to beam path 20. Oven 30 comprises thermal insulation 35, oven wall 40, and heating element 45. Thermal insulation 35 is a hollow cylinder having open ends that separates the heated portion of oven 30 from accelerator tube 50. Accelerator tube 50 is a portion of the high-voltage terminal at the junction of two sections of a tandem electrostatic accelerator. The practice of this invention is unchanged if the apparatus described is disposed in the beam of a different type of accelerator such as a linear accelerator, a synchrotron, or a cyclotron.

Oven wall 40 is an open-ended hollow cylinder, coaxial with thermal insulation 35 and beam path 20, nested within thermal insulation 35. Heating element 45 is an electrical heater disposed parallel to beam path 20 and within oven wall 40 so as to heat oven 30, but disposed off the axis of oven 30 and thus out of beam path 20. Carbon foil 10 and holder 15 are disposed within oven 30 and in beam path 20 so that oven 30 maintains carbon foil 10 at an elevated temperature during stripping.

Holder 15 is supported in beam path 20 by mounting structure 55, which extends from flange 60 in accelerator tube 50 through aperture 65 in oven 30. Mounting structure 55 maintains holder 15 in rigid unitary relationship with flange 60, which in turn is in unitary relationship with accelerator tube 50. Mounting structure 55 is an electrical conductor to provide a return path for charges. Flange 60 is a vacuum flange to provide access to accelerator tube 50 for replacing carbon foil 10 with a new one, while preserving the necessary vacuum for normal accelerator operation. Electricity to heating element 45 is supplied through feedthroughs 70, which provide electrical insulation and vacuum integrity while conducting electricity from electrical supply 75 into accelerator tube 50 and to heating element 45.

Figure 3:
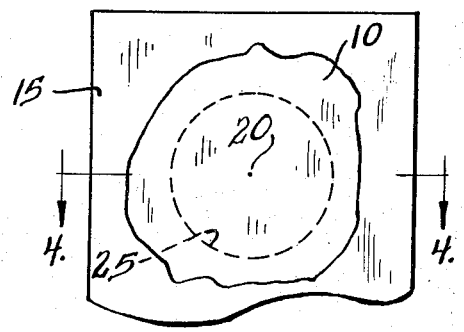
FIG. 3 is a front view of a foil mounted on a foil holder for the practice of the present invention with the apparatus of FIGS. 1 and 2.
Figure 4:
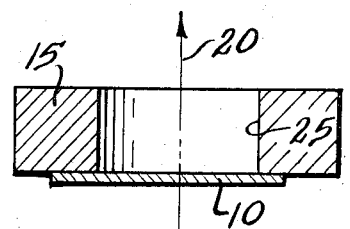
FIG. 4 is a sectional view of the structure shown in FIG. 3 taken along section lines 4—4.

Operation of the apparatus of FIGS. 1 and 2 proceeds as follows. Electrical supply 75 is energized to heat oven 30 before a beam is caused to pass along beam path 20. When oven 30 has been heated to a predetermined temperature equal to or greater than 150°C., the accelerator is operated, causing a beam to strike carbon foil 10 and thus be stripped. Carbon foil 10 is kept at an elevated temperature during stripping, as it has been observed that this extends the lifetime of the foil which are used with the apparatus of FIGS. 1 and 2. FIG. 4 is a sectional view of FIG. 3 along section lines 4—4. In FIGS. 3 and 4, holder 15 is a rectangular parallelepiped having a square cross section with a third dimension that is smaller than a side of the square. An opening 25 is a round hole passing through holder 15 in the direction of the short dimension, perpendicular to and at the center of the square. The holder 15 is adapted to be mounted within the accelerator so that the center of opening 25 is disposed on beam path 20 of FIGS. 1 and 2 such that beam path 20 passes through opening 25. Carbon foil 10 is placed on holder 15 so as to cover opening 25, which is chosen to be greater in diameter than the beam. A beam passing through opening 25 thus passes through carbon foil 10 and is stripped.

Carbon foil 10 is produced by sputtering or vapor-depositing carbon on a soluble base in a layer ranging in thickness from a few tens of A to values in excess of 500 A. The base is then dissolved in a solvent to leave the thin carbon foil 10, which adheres readily to materials such as graphite, quartz, or Invar, from which holder 15 is made. The irregular edge of carbon foil 10 as shown in FIG. 3 is typical of thin foils produced by this process.

Figure 5:
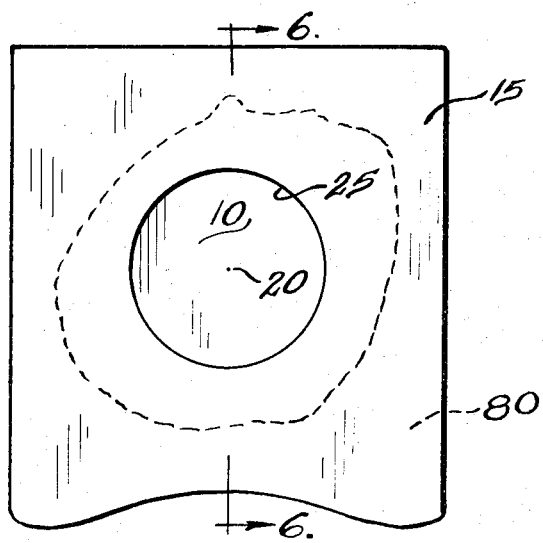
FIG. 5 is a front view of a foil coated with an electrically conductive coating and mounted on a foil holder for the practice of the present invention with the apparatus of FIGS. 1 and 2.
Figure 6:
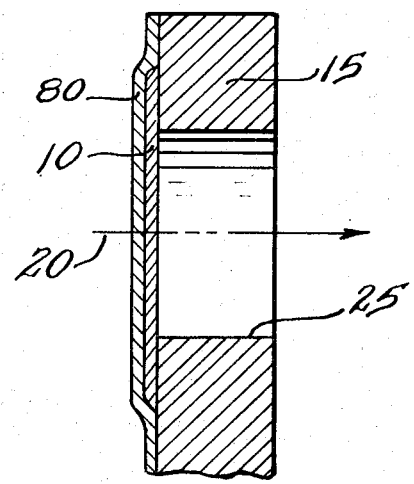
FIG. 6 is a sectional view of the foil and holder shown in FIG. 5 taken along section lines 6—6.

An alternate embodiment of the foil and holder of the present invention is shown in FIGS. 5 and 6. FIG. 5 is a view of a carbon foil and holder as seen along beam path 20 of FIG. 1, and FIG. 6 is a sectional view of the foil and holder of FIG. 5, taken along section lines 6—6. Opening 25 in holder 15 is covered by carbon foil 10, which in turn is covered by electrical conductor 80. Electrical conductor 80 is sputtered or vapor-deposited to form a thin layer over a surface of holder 15 and carbon foil 10. Electrical conductor 80 helps to maintain an equipotential surface along carbon foil 10 while a beam of charged particles is incident thereon, thus reducing the electrostatic stresses that result from an accumulation of stripped charges. Electrical conductor 80 also facilitates the escape of stripped charges from the stripper and the completion of an electric circuit to return these charges to the source of electrical energy.

An apparatus for the practice of the principles of the present invention has been constructed at the Argonne National Laboratory. Carbon foils were subjected to bombardment by singly-charged ions of $^{58}$Ni and $^{127}$I accelerated to energies in the range of 3–4 MeV in an electrostatic particle accelerator. Beam densities at the stripper were maintained at various values up to 1 microampere distributed uniformly over an area of 1 mm$^2$. An oven approximately 8 inches in length was operated at a number of temperatures. Best results were achieved at an oven temperature of 400°C. as measured by a thermocouple, although improvement was noted at temperatures as low as 150°C. The upper temperature limit for such heating is set only by the melting temperatures of the foil, the deposited electrical conductor, and the holder.

Carbon foils used to practice this invention were deposited to surface densities of 2–10 micrograms of carbon per cm$^2$, corresponding to thicknesses of approximately 100–500 A. Holders were made of various materials selected to minimize stress on carbon foils due to excessive or unequal thermal expansion. Successful results were achieved using high-density graphite, quartz, and an iron-nickel alloy having a very small coefficient of thermal expansion that is sold under the trademark Invar. Gold has been used successfully as the electrical conductor, sputtered over the carbon foil and holder at a surface mass density of approximately 2 micrograms per cm$^2$. This corresponds to a thickness of approximately 10 A. Gold was a convenient material to use as a sputtered electrical conductor, but other electrical conductors may be substituted therefor. The requirements for such an electrical conductor are that the material be capable of sputtering or vapor deposition on a foil and holder, that it adhere thereto, and that it withstand temperatures in the operating range described above. Other materials that would suffice include silver, platinum, palladium, vanadium, beryllium, and nickel. Three foils formed of carbon deposited at a surface density of 5 micrograms of carbon per cm$^2$ were deposited on graphite holders, coated with gold at a surface density of 2 micrograms per cm$^2$, and heated to 400°C. before and during their exposure to a 4-MeV beam of singly ionized atoms of $^{58}$Ni. These foils remained intact and usable as strippers for periods of 28, 23, and 33 minutes before failing.

Persons skilled in the art will find other ways to apply the teachings of this invention. Accordingly, the scope of the invention should be limited only by the appended claims and the equivalents thereof.

The embodiments of the invention in which an exclusive property or privilege is claimed are defined as follows:

1. The improvement in the method of stripping charges from particles in particle beams by collision with carbon foil comprising the step of heating the carbon foil to a temperature equal to or greater than 150°C. before and during stripping.

2. The method of claim 1 comprising in addition the first step of coating the carbon foil with a layer of a metallic electrical conductor having a thickness less than 100 A.

3. The method of claim 2 comprising in addition the second step of mounting the carbon foil on a holder made of a material having a thermal coefficient of linear expansion that is equal to or less than that of carbon.

4. An apparatus for effecting charge exchange in a particle beam from an accelerator comprising,
   a carbon foil disposed in and intercepting said beam, and heating means thermally coupled to said carbon foil to heat said foil during said charge exchange.

5. The apparatus of claim 4 wherein said carbon foil is of a thickness between 50 A and 500 A.

6. The apparatus of claim 5 wherein said carbon foil includes a layer of a metallic electrical conductor having a thickness less than 100 A.

7. The apparatus of claim 6 comprising in addition a holder affixed to said foil, said holder having a passage to admit said particle beam without engagement, said holder further mounted in physical engagement and in electrical connection with said accelerator, and said holder formed of a material having a thermal coefficient of linear expansion that is equal to or less than that of carbon.

* * * * *